United States Patent Office 3,297,411
Patented Jan. 10, 1967

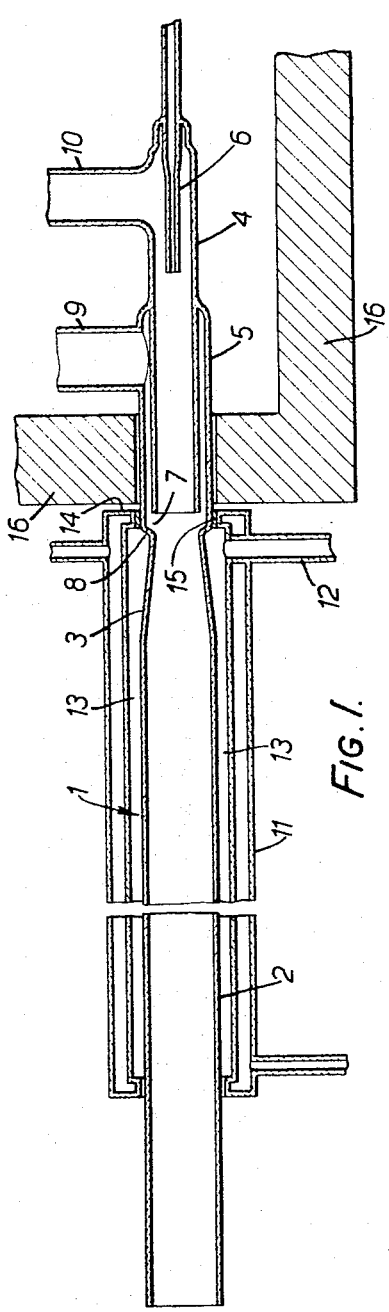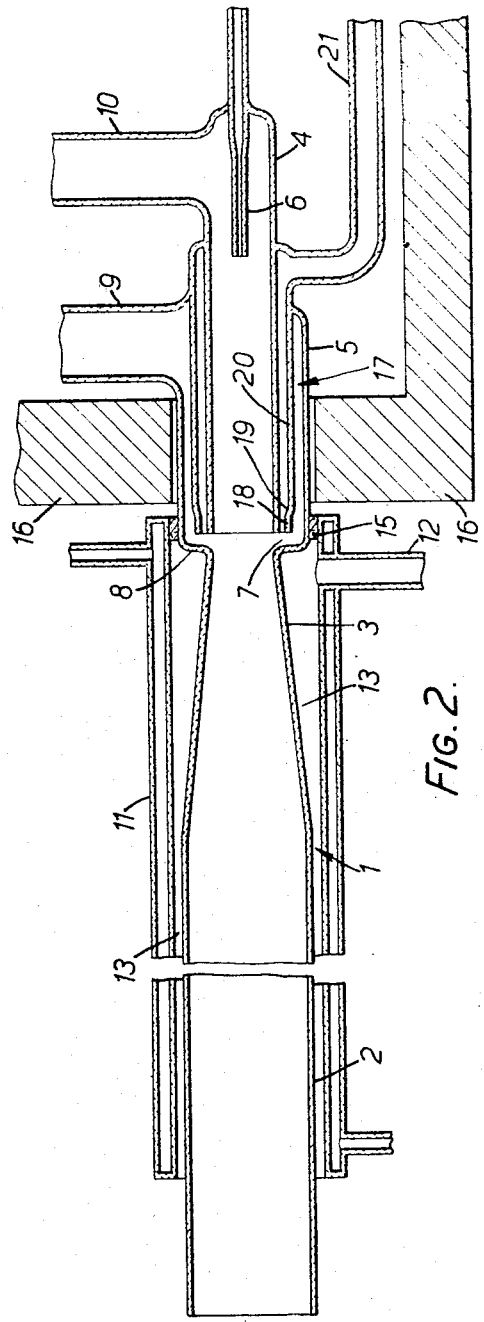

3,297,411
BURNER REACTOR APPARATUS
William Neel Dear, Theydon Bois, Essex, England, assignor to Laporte Titanium Limited, London, England, a British company
Filed May 13, 1964, Ser. No. 367,057
Claims priority, application Great Britain, June 10, 1963, 23,047/63
10 Claims. (Cl. 23—284)

This invention relates to the manufacture of oxides of the elements titanium, zirconium, iron, aluminium and silicon by the oxidation of chlorides of those elements.

It has previously been proposed to manufacture titanium dioxide by reacting titanium tetrachloride with oxygen in the vapor phase, but difficulty has been experienced because at least a part of the titanium dioxide tends to be formed as a deposit on reactor surfaces that are exposed to contact with either the hot reactant mixture or the hot titanium dioxide produced by the reaction or both.

This deposition of titanium dioxide constitutes a serious difficulty for several reasons.

First, the deposited titanium dioxide is not in finely divided pigmentary form and when, as is usually the case, it is desired to produce pigmentary titanium dioxide, the formation of the deposited non-pigmentary titanium dioxide reduces the overall efficiency of the process.

Secondly, the build-up of deposited titanium dioxide can necessitate frequent interruption of the process in order to remove the deposited material before blockage occurs. The risk of blockage is especially great when the build-up of deposited titanium dioxide occurs in the region of a gas inlet through which one of the reactants is introduced into the reaction chamber.

Third, if the wall of the reaction chamber is made of a refractory material such as silica, even a thin layer of deposited titanium dioxide can cause the wall of the reaction chamber to crack as a result of differential contraction when the reactor is allowed to cool.

Similar considerations apply if attempts are made to manufacture the other oxides referred to above by such a process.

This invention provides a process for the manufacture of an oxide of one of the elements titanium, zirconium, iron, aluminium and silicon by reacting a chloride of the element with an oxidizing gas in the vapor phase, which comprises preheating the chloride and the oxidizing gas to such a degree that if no reaction were to take place between the chloride and the oxidizing gas the temperature of the gaseous mixture within the reaction chamber would be at least 700° C. One of the preheated reactants then is introduced into a generally tubular reaction chamber, constructed of a non-metallic refractory material, through first inlet means. The other preheated reactant is introduced into the reaction chamber through second inlet means situated downstream of the first inlet means. The second inlet means is in the form of a circumferentially extending slot formed in the wall of the reaction chamber and the arrangement being such that there is produced a turbulent stream of intimately mixed gases which flows in the direction of the length of the chamber and in which the oxide is produced in finely divided form. The portion of the reaction chamber which is downstream of the second inlet means is cooled by means of a coolant fluid flowing in heat-exchanging relation with the outer surface of the said portion, but out of contact with the reactants, to such an extent that the inner surface of the reaction chamber that is in contact with the reactant mixture and/or with the oxide produced by the reaction is maintained at a temperature not exceeding 900° C. An inert particulate refractory material is introduced into the reaction chamber in suspension in a gas through a nozzle arranged coaxially within the reaction chamber and upstream of the second inlet means in such manner that the said particulate material impinges on the inner surface or surfaces of the reaction chamber immediately adjacent to the second inlet means to prevent or substantially reduce any tendency for the deposition of product oxide on the said inner surface or surfaces to occur. The inner surface of the portion of the reaction chamber immediately adjacent to and downstream of the second inlet means is tapered in an upstream direction, the degree of taper being sufficiently small to enable the whole of the tapered surface to be seen from the end of the nozzle. The said particulate material is substantially carried out of the reaction chamber in suspension in the turbulent gas stream. Thereafter, the said particulate material is separated from the product oxide.

The invention also provides apparatus for the manufacture of an oxide of one of the elements titanium, zirconium, iron, aluminium and silicon by reacting a chloride of the element with an oxidizing gas in the vapor phase. The apparatus comprises means for preheating the chloride and the oxidizing gas and a generally tubular reaction chamber constructed of a non-metallic refractory material provided with first inlet means through which one of the preheated reactants can be introduced and second inlet means through which the other preheated reactant can be introduced. The second inlet means is situated downstream of the first inlet means and is in the form of a circumferentially extending slot formed in the wall of the reaction chamber, the arrangement being such that, in operation, there is provided a turbulent stream of intimately mixed gases which flows in the direction of the length of the chamber and in which the oxide is formed in finely divided form. A jacket is provided through which a coolant fluid can be passed in heat-exchanging relation with the outer surface of the portion of the reaction chamber downstream of the second inlet means but out of contact with the inner surface of the said portion. A nozzle is arranged coaxially within the reaction chamber and upstream of the second inlet means. This provides means through which an inert particulate refractory material can be introduced into the reaction chamber in suspension in a gas in such manner that, in operation, the said particulate material impinges on the inner surface or surfaces of the reaction chamber immediately adjacent to the second inlet means. The inner surface of the portion of the reaction chamber immediately adjacent to and downstream of the second inlet means is tapered in an upstream direction, the degree of taper being sufficiently small to enable the whole of the tapered surface to be seen from the end of the nozzle. Means also is provided for separating the said particulate material from the product oxide.

The reason why the impingement of the inert particulate refractory material on the surfaces referred to should substantially reduce the build-up of product oxide on those surfaces is not fully understood. However, it seems probable that the material exerts a brushing action on the deposited product oxide. In addition, the inert particulate refractory material may assist removal of the deposited product oxide by the gas stream, because the material will tend to break up the layer of relatively stagnant gas adjacent to the wall of the reaction chamber. The inert particulate refractory material also reduces the build-up of product oxide on reactor surfaces further downstream from the second inlet means.

The fact that the inner surface of the portion of the reaction chamber immediately adjacent to and downstream of the second inlet means is tapered in the manner specified enables a relatively small internal diameter at the second inlet means (which gives a high gas velocity and therefore good mixing of the reactants) to be combined with a larger internal diameter further downstream (which lessens the overall pressure drop across the apparatus and tends to lessen the risk of premature quenching of the reaction) without rendering any part of the inner surface of that portion of the reaction chamber inaccessible to the inert particulate refractory material.

The cooling of the portion of the reaction chamber that is downstream of the second inlet means has two especially beneficial results. First, product oxide that is deposited on the cooled reactor surfaces is in a softer form than it would be if it were deposited on uncooled reactor surfaces. This greatly facilitates the removal of such deposited product oxide by the particulate refractory material. Secondly, because an important heat transfer mechanism tending to raise the temperature of the particulate refractory material is conduction from the reactor surfaces during collision of the particles with the reactor surfaces, the cooling of these surfaces tends to reduce the maximum temperature reached by the particulate refractory material. As is explained hereinafter, it is advantageous that this material shall not reach too high a temperature, because otherwise product oxide may be deposited on the particles at an undesirably high rate.

The flow velocity in the region where mixing takes place within the reaction chamber is determined by the mass flow rate of the gaseous mixture and the internal diameter of the reaction chamber in the region where mixing takes place. The rate of mixing is dependent upon the flow velocity, but, at high values of the Reynolds number, the rate of mixing is more closely related to the internal diameter of the chamber where mixing takes place than to the Reynolds number. Therefore, the tapered form of construction results in a higher rate of mixing with a given flow velocity than would be obtained in a reaction chamber in which the flow velocity was the same but in which the internal diameter where mixing takes place was larger. The high rate of mixing of the reactants shortens the period of time that elapses before the reaction starts and, because this period of time decreases more than in inverse proportion to the flow velocity, this decreases the area of the inner surface of the reaction chamber that is exposed to the mixed reactants before the reaction starts. The desirability of restricting the internal diameter of the reaction chamber in the region where the reactants mix is greater for reaction chambers of larger internal diameter.

An especially important form of the process is that in which the product oxide is pigmentary titanium dioxide and the chloride is titanium tetrachloride.

Advantageously, the non-metallic refractory material of which the reaction chamber is constructed is silica or alumina. Of these two mateirals, alumina has certain advantages over silica for parts exposed to very high temperatures, but parts of complicated shape are more easily fabricated in silica and this material is generally to be preferred. The silica may be, for example, transparent fused quartz or translucent fused quartz. If desired, one refractory material may be used for one portion of the reaction chamber and a different refractory material may be used for another portion of the reaction chamber.

As the reaction chamber is constructed of a non-metallic refractory material, it is found that even a relatively small degree of cooling of the portion of the reaction chamber downstream of the second inlet means is beneficial, especially for the parts of the said inner surface that are a considerable distance downstream of the second inlet means and when the amount of oxidizing gas is in excess of that required to react stoichiometrically with the chloride. If the reaction temperature is within the range of from 1000° C. to 1300° C., the inner surface of the said portion is advantageously cooled to a temperature not exceeding 800° C., preferably, not exceeding 650° C.

The oxidizing gas advantageously comprises molecular oxygen and it may consist of substantially pure oxygen or of oxygen in admixture with an inert gas or gases; for example, the oxidizing gas may be air or oxygen-enriched air. One effect of using air or oxygen-enriched air instead of pure oxygen as the oxidizing gas is a tendency for the production of an oxide having a smaller particle size. The choice of the oxidizing gas depends primarily upon the chloride and the internal dimensions of the reaction chamber in a direction transverse to the longitudinal axis of the reaction chamber. Other relevant factors are the degree to which the reactants are preheated and the temperature to which the inner surface of the portion of the reaction chamber downstream of the second inlet means is cooled. The proportion of oxygen in the oxidizing gas is one of the factors that determines the maximum temperature reached by the gaseous mixture in the reaction zone, the temperature distribution along the length of the reaction zone and the particle size of the product oxide. An increase in the proportion of oxygen tends to result in an increase in the maximum temperature, in the temperature falling off less quickly along the length of the reaction zone and in an increase in the particle size of the product oxide. When the chloride is titanium tetrachloride and the internal dimensions of the reaction chamber in a direction transverse to its longitudinal axis are small, for example, when the reaction chamber is cylindrical and has a maximum internal diameter of four inches or less, there is a risk that the reaction will be prematurely quenched if the oxidizing gas is air. It is then necessary to use an oxidizing gas containing a higher proportion of oxygen, for example, oxygen-enriched air or substantially pure oxygen.

The risk of premature quenching of the reaction is greater when the temperature to which the inner surface of the portion of the reaction chamber downstream of the second inlet means is cooled is lower, but this factor is usually less important than the internal dimensions of the reaction chamber. The risk of premature quenching can be diminished by increasing the degree of preheat of the reactants, but the use of very high degrees of preheat leads to technical difficulties.

In the case of a cylindrical reaction chamber having a maximum internal diameter greater than about four inches, the ratio of the internal volume of the chamber to the area of the inner surface that is cooled is larger and it may, therefore, be possible to use air as the oxidizing gas without the risk that the reaction will be prematurely quenched. However, the reduction in the proportion of oxygen in the oxidizing gas may result in the production of titanium dioxide having a particle size which is too small for use as a pigment.

Therefore, it may be necessary, in such circumstances, to increase the proportion of oxygen in the oxidizing gas. This may then permit or necessitate an increase in the degree of cooling of the inner surface of the chamber.

The rate of introduction of the oxidizing gas into the interior of the reaction chamber for reaction with the chloride may be within the range of 90 to 110 percent of the rate required for stoichiometric reaction with the chloride, but is advantageously greater than that rate, for example, within the range of from 5% to 10% in excess of that rate. In addition to the quantity of oxidizing gas introduced for reaction with the chloride, it is also necessary to introduce sufficient oxidizing gas for stoichiometric reaction with any additives which (as is described hereinafter) may be introduced into the reaction chamber. It is necessary to introduce such an additional amount of oxidizing gas notwithstanding the fact that the rate as specified above may be in excess of the rate required for stoichiometric reaction with the chloride. In determining a suitable rate of introduction of the oxidizing gas, both the rate of introduction of the preheated oxidizing gas and of any oxidizing gas introduced into the reaction chamber as a carrier gas for the inert particulate refractory material must be included.

In order that the gas stream within the reactor shall be sufficiently highly turbulent to ensure that intimate mixing occurs, it is essential that the flow rate of the gaseous mixture within the oxidation zone shall correspond to a Reynold's flow number of at least 10,000 and preferably at least 20,000.

The chloride may be introduced into the reaction chamber through the first inlet means and the oxidizing gas may be introduced into the reaction chamber through the second inlet means. Advantageously, the oxidizing gas is introduced into the reaction chamber through the first inlet means and the chloride is introduced into the reaction chamber through the second inlet means.

The reactant that is introduced into the reaction chamber through the second inlet means must be introduced at a sufficiently high velocity to prevent the other reactant from diffusing through the second inlet means against the gas flow, because otherwise reaction would take place within the second inlet means or a supply conduit leading thereto with a consequent risk of blockage. Advantageously, the reactant that is introduced into the reaction chamber through the second inlet means is fed to the second inlet means at such a rate that the velocity of that reactant immediately prior to its introduction into the reaction chamber is within the range of from 100 to 300 feet per second.

The first inlet means may be of any convenient form, for example, an opening in the side wall of the reaction chamber towards the upstream end thereof or an opening in the upstream end of the reaction chamber. The first inlet means should of course be situated sufficiently far upstream from the second inlet means to ensure that any gross asymmetry of the distribution of the reactant introduced through the first inlet means is smoothed out before that reactant reaches the second inlet means.

The invention also provides a modification of the process and the apparatus, wherein the nozzle for the introduction of an inert particulate refractory material into the reaction chamber in suspension in a gas also serves as the first inlet means, the inert particulate refractory material being introduced in suspension in the preheated reactant that is introduced into the reaction chamber through the first inlet means. When the nozzle serves as the first inlet means, the inert particulate refractory material is preferably introduced in suspension in the preheated oxidizing gas.

Advantageously, the part of the reaction chamber upstream of the second inlet means comprises an outer generally tubular portion and an inner portion, which is substantially coaxial with the outer generally tubular portion and which terminates short of the outer portion, the downstream end of the said inner portion having a diameter substantially equal to the diameter of the upstream end of the portion of the reaction chamber downstream of the second inlet means, the arrangement being such that the inner portion and the said downstream portion of the reaction chamber together define the circumferentially extending slot that constitutes the second inlet means, and one of the preheated reactants is fed to the space between the said inner and outer portions. Preferably, the portion of the reaction chamber downstream of the second inlet means and the outer generally tubular portion are made in one piece, thereby avoiding the need to provide between these parts of the apparatus a weld or other type of joint that would be sufficiently robust and gas-tight despite the considerable temperature differences that exist between those parts. Also, with such a method of construction, the jacket through which a coolant fluid can be passed in heat-exchanging relation with the outer surface of the portion of the reaction chamber downstream of the second inlet means may be readily arranged to extend, in an upstream direction, to a point close to the second inlet means.

The inert particulate refractory material that is introduced into the reaction chamber in suspension in a gas must be a hard solid that is not substantially attacked by chlorine at the temperature and under the other conditions that obtain during the reaction. The material may be zircon particles, or alumina particles, or titanium dioxide particles that have been withdrawn from a fluidized bed of titanium dioxide particles used in a process for the manufacture of titanium dioxide by the vapor phase oxidation of titanium tetrachloride within the bed. Advantageously, the material is silica sand. The material may also be a mixture of more than one of these materials.

To avoid undue wear of the surface or surfaces of the reaction chamber upon which the material impinges, the particles are advantageously rounded. Substantially all the particles may have sizes of +85 mesh (B.S.S.). The practical upper limit of the particle size is determined, in general, by the requirement that the particulate refractory material shall be carried out of the reaction chamber by the gas stream. Advantageously, substantially all the particles have sizes within the range of from −8 to +30 mesh (B.S.S.).

The optimum rate of introduction of the inert particulate refractory material depends on the design and dimensions of the reactor and may be varied during the operation of the process. If the rate is high, the quantity of the material to be separated from the product oxide is correspondingly large and, when (as is described hereinafter) the material is introduced into the reaction chamber at a low temperature, undue cooling of the reactants may occur with consequent incomplete reaction.

The inert particulate refractory material should be introduced into the reaction chamber at a velocity of at least 75 feet per second, preferably at least 100 feet per second. The upper limit for the velocity of introduction of the inert particulate refractory material is determined by the requirement that the velocity should not be so high as to cause undue wear of the reactor surface or surfaces.

Generally, in order to avoid undue wear of the surface or surfaces of the reaction chamber upon which the insert particulate refractory material impinges, the velocity of introduction of the inert particulate refractory material should not exceed about 300–400 feet per second.

Advantageously, the inert particulate refractory material is introduced into the reaction chamber at a temperature substantially below the temperatures at which the preheated oxidizing gas and the preheated chloride are introduced into the reaction chamber, because, if the particulate refractory material reaches too high a temperature (more than approximately 900° C. when the product oxide is titanium dioxide) before it leaves the reaction chamber, product oxide may be deposited on the particulate refractory material to an undesirable extent. On the other hand, it is important that the reactants shall not be unduly cooled by the introduction of the particulate refractory material. Also, when the particulate refractory material is material that has been recycled after separation from product oxide (as is described hereinafter), some unreacted chloride may (especially if the efficiency of the reaction in terms of the chloride utilization is considerably less than 100%) be adsorbed on the material and the material should then not be cooled below the dew-point of the chloride (thus, the material should not be cooled below a temperature of approximately 150° C. when the chloride is titanium tetrachloride, of which the dew-point at atmospheric pressure is 136° C.) before it is reintroduced into the reaction chamber.

When the nozzle for the introduction of the inert particulate refractory material into the reaction chamber does not serve as the first inlet means, the gas in suspension in which the said material is introduced may be an inert gas, that is to say, a gas that is inert to the reactants under the conditions of the reaction, for example, chlorine or nitrogen, or, when the chloride is introduced into the reaction chamber through the second inlet means, an oxidizing gas that has not been preheated or that has been preheated to a lesser extent than the preheated oxidizing gas that is introduced into the reaction chamber through the first inlet means. Of the inert gases, chlorine is generally to be preferred, because it does not reduce the concentration of chlorine in the product gas stream. When a small reaction chamber (that is to say, a reaction chamber having an internal diameter not exceeding four inches at the second inlet means) is used, however, the gas is advantageously an oxidizing gas, preferably, oxygen.

The introduction of the suspension of the inert particulate refractory material in a gas into the reaction chamber in suspension in a gas other than one of the preheated reactants has the advantage that it enables the inert particulate refractory material to be introduced into the reaction chamber at a temperature considerably lower than the temperatures at which the preheated reactants are introduced into the reaction chamber.

The gas, other than one of the preheated reactants, in which the inert particulate refractory material is suspended may be introduced into the reaction chamber at a temperature not greater than 150° C. In order to minimize the disadvantages associated with the introduction of a relatively cold gas into the reaction chamber, the concentration of the particulate refractory material in that gas should be high, say, about 0.2 pound of material per cubic foot of gas (measured at the pressure of introduction of the gas into the reaction chamber).

The nozzle for the introduction of the suspension of inert particulate refractory material in a gas may be made of a suitable corrosion-resistant metal surrounded, if necessary and provided that the nozzle does not serve as the first inlet means, by a cooling jacket through which a coolant fluid can be passed. Such a metal nozzle may be joined to the reaction chamber by means of a joint similar to the joint between the metal part and the refractory part of the reaction chamber described in pending U.S. patent application Serial No. 318,337 except that the cooling means for the ring may in some cases be omitted.

The product oxide is advantageously separated from the inert particulate refractory material using settling chambers, but dry or wet cyclones may be used either instead of or following the settling chambers. After it has been separated from the product oxide, the inert particulate refractory material advantageously is cooled and thereafter recycled to the reaction chamber.

In addition to the use of an inert particulate refractory material to prevent or reduce any tendency for product oxide to be deposited on the inner surface of the reaction chamber immediately adjacent to and upstream of the second inlet means, this surface may be shielded from the reactants by introducing a barrier gas that is inert to both reactants, preferably chlorine produced by the reaction or nitrogen, into the reaction chamber at a temperature of at least 150° C. between the second inlet means and the said surface. Thus, when the upstream portion of the reaction chamber comprises outer and inner generally tubular portions as hereinbefore specified, there may be provided an intermediate generally tubular portion, which terminates level with the end of the inner generally tubular portion, the reactant that is introduced through the second inlet means being fed through the region between the outer and intermediate generally tubular portions and the barrier gas being fed through the region between the intermediate and inner generally tubular portions. Advantageously, the velocity of the barrier gas immediately before it leaves the region between the outer and intermediate generally tubular portions is at least 100 feet per second (preferably, about 300 feet per second). The wall thickness of the inner generally tubular portion is advantageously, at its downstream end, not greater than ⅛ inch. Advantageously, the intermediate portion is tapered in a downstream direction at or close to its downstream end to reduce the cross-sectional area of the barrier gas inlet.

In order to prevent undue cooling of the reactants, especially when a small reaction chamber is used, the barrier gas is preferably introduced into the reaction chamber at a temperature within the range of from 600° C. to 1000° C. The use of a barrier gas for such a purpose is described in pending U.S. application Serial No. 234,364.

It is important that the design of the reactor, the temperatures and the reactant flow rates be such that the reactants and the products of the reaction remain within the oxidation zone for a period that is long enough to ensure substantially complete reaction, but not so long as to cause undesirable particle growth of the product oxide. Usually, detention times within the range of from 0.02 to 10 seconds will be found to be suitable. When the oxidizing gas is pure oxygen or oxygen-enriched air, however, the detention time can, under suitable conditions, be as low as 0.01 second. When the gaseous reaction products, with the product oxide in suspension, leave the oxidation zone, they are advantageously subjected to a quick cooling or quenching treatment to a temperature below 900° C. (preferably below 650° C.). This quenching of the reaction products may take place at a time within the range of from 0.01 to 10 seconds (preferably 0.05 to 5 seconds) from the time of introduction of the chloride into the oxidation zone. The quenching may be effected by mixing cooled product gas, for example, chlorine, with the product gas stream containing the product oxide in suspension, or by dispersing in the product gas stream a cold inert particulate refractory solid which is preferably the same as the particulate refractory solid used to prevent or reduce the deposition of the product oxide on reactor surfaces. Another method of quenching is to pass the products at high velocity through cooled tubes.

When the chloride is titanium tetrachloride, the titanium tetrachloride vapor is advantageously produced from liquid titanium tetrachloride in a flash boiler, which may be constructed of aluminium, or a suitable alloy of aluminium or a corrosion-resistant steel, for example, a stainless steel.

When the chloride is titanium tetrachloride, the reactants (including any inert constituents of the oxidizing gas) are advantageously preheated to such a degree that, if no reaction were to take place between the titanium tetrachloride and the oxidizing gas (but not excluding reaction taking place between the oxidizing gas and any additives that may be introduced into the reaction chamber), the temperature of the gaseous mixture within the reaction chamber would be within the range of from 850° C. ot 1100° C. (preferably, within the range of from 950° C. to 1050° C.). Thus, the necessary degree of preheat of the reactants depends in part on the quantities, temperatures and nature of other gases, for example, the gas in suspension in which the inert particulate refractory material is introduced, inert barrier gas and hydrocarbons introduced into the reaction chamber, etc. The introduction of quantities of cool gas generally makes for a higher degree of preheat of the reactants necessary, except when the cool gas (or a part thereof) undergoes exothermic reaction with the oxidizing gas.

When the oxidizing gas contains a substantial proportion of inert gas, for example, when the oxidizing gas is air or oxygen-enriched air, it is usually convenient to preheat the oxidizing gas to a greater degree than the chloride. When the oxidizing gas is substantially pure oxygen, however, it is preferable to preheat the chloride to a greater degree than the oxidizing gas.

The oxidizing gas may be preheated directly by incorporating with it a hot gaseous combustion product obtained by burning a fuel gas, for example, carbon monoxide, but each of the reactants, especially the chloride, is advantageously preheated indirectly, that is to say, by passing the reactant through a heated tube or other heat-exchange means. If desired, the oxidizing gas may be both directly and indirectly preheated. The reactants may instead be preheated by means of pebble heaters or fluidized bed heaters (including both fluidized bed heaters in which there is provided an internal electric heater and fluidized bed heaters in which particles are withdrawn from the bed, heated externally and reintroduced into the bed).

When one or both of the reactants is indirectly preheated, this is advantageously effected by passing the reactant through a heated tube of which the configuration is such that at least a substantial part of the strain in the tube that results from thermal stresses is torsional strain. As compared with the use of a tube of which the configuration is such that substantially all the thermal stress results in bending, this reduces the relative movements of different parts of the tube during heating and cooling and so facilitates the supporting of the tube. Advantageously, the tube is made up of a plurality of straight portions, the axes of which are substantially parallel to one another and which are separated from one another by portions extending at an angle (preferably, substantially a right-angle) to the said straight portions, the arrangement being such that the axes of the said straight portions lie alternately in a given plane and out of the plane (preferably in a second plane, which may be parallel to the first-mentioned plane). Instead, the tube may be in the form of a helix. Except at its ends, the tube is advantageously supported only from below, that is to say, by means that does not itself prevent upward or horizontal movement of the tube. The or each heated tube may be supported on firebricks.

Advantageously, the or each heated tube is supported by a plurality of supporting members, which are constructed of a refractory material and are mounted on a fluid-cooled metal structure. The supporting members are advantageously constructed of silica and are advantageously in the form of crutches formed with semi-cylindrical cavities in which the tube rests. The metal structure may be constructed of steel or Inconel and may be tubular, the cooling being effected by passing a suitable coolant, for example, water, through the tubing. Preferably, the degree of cooling of the metal structure is so controlled that the movement of the supporting members resulting from expansion and contraction of the metal structure is substantially the same as the movement of the portions of the heated tube that are in contact with the supporting members resulting from expansion and contraction of the heated tube.

To minimize heat losses, the surfaces of the metal structure may be shielded by suitable refractory bricks or like members, for example, firebricks. It is of course important that the expansion and contraction of these firebricks should not affect the movements of the heated tube and the supporting members and, in order to achieve this result without providing large gaps between the bricks on the one hand and the supporting members and the heated tube on the other hand, at least some of the bricks or like members are advantageously mounted on the metal structure. Some of the bricks mounted on the metal structure may be interposed between the metal structure and the supporting members, provided that the thickness of such interposed bricks or like members is not so large that expansion or contraction of such interposed bricks or like members causes any substantial movement of the supporting members relative to the metal structure. Thus, the metal structure may comprise a plurality of substantially vertical pillars formed with horizontally extending brackets (which support the bricks or like members and the supporting members) and both the supporting members and the bricks or like members may be slotted or formed with apertures to fit around the pillars. If desired, the strength of the metal structure may be increased by providing bridge portions inter-connecting the or some of the pillars.

For preheating the chloride, the heated tube must be constructed from a refractory material, preferably silica. For preheating the oxidizing gas, however, it is possible to use a metal tube provided that the degree of preheat is not too high (normally not exceeding 1000° C. for air and not exceeding 850° C. for substantially pure oxygen). The tube is preferably heated by radiation. Thus, the heat may be supplied by a heater burning coal gas or butane arranged to heat brickwork, the surface of which radiates heat to the tube. Instead, an electric heater, which may be, for example, of the silicon-carbon resistance type, may be used, the arrangement being such that the tube is heated partly by heat radiated directly from the electric heater itself and partly by heat radiated from brickwork that has been heated by the electric heater. When the tube is made of metal, an oil heater may be used. In addition to being heated by radiant heat, when the tube is supported on firebricks some heat may be supplied to the tube by conduction from brickwork that is in contact with the tube.

Advantageously, the portion of the reaction chamber upstream of the second inlet means is also heated (conveniently, by means of the heater used to heat the preheater tube) in order to prevent or reduce loss of heat from the reactant introduced through the first inlet means before it meets the other reactant.

To provide additional heat in the region where the reactants meet, suitable hydrocarbons may be incorporated with the preheated chloride so that they undergo combustion when the chloride comes into contact with the oxidizing gas. If such hydrocarbons are incorporated with the preheated chloride, it may not be necessary to preheat the chloride and/or the oxidizing gas to as great a degree as would otherwise be desirable. As explained hereinbefore, however, the rate of introduction of oxidizing gas into the reaction chamber has to be sufficient to provide the extra oxidizing gas for the combustion of the hydrocarbons.

The coolant fluid used to cool the portion of the reaction chamber downstream of the second inlet means may be, in the case of a coolant fluid that is in contact with the outer surface of that portion of the reaction chamber, air, a molten metal, for example, sodium, mercury or lead, or a molten metal salt or a molten mixture of metal salts (for example, a mixture consisting of 40% sodium nitrite, 7% sodium nitrate and 53% potassium nitrate by weight, and having a melting point of 141.2° C.). Advantageously, when the said coolant fluid is a gas, for example, air, the said portion of the reaction chamber is provided with a cooling jacket constructed of a metal, the cooling jacket comprising an inner generally tubular portion substantially coaxial with the reaction chamber and an outer generally tubular portion substantially coaxial with the inner portion, the arrangement being such that a coolant liquid, for example, oil, a molten metal, a molten mixture of metal salts or, preferably, water, may be fed to the space between the said inner and outer portions, and such that the coolant gas, for example, steam or air, may be fed to the space between the inner portion and the outer surface of the reaction chamber. In such an arrangement a substantial part of the heat lost from the reaction chamber is lost by radiation from the outer surface of the reaction chamber to the metal cooling jacket.

Advantageously, there is introduced into the oxidation zone a quantity of water vapor within the range of from 0.05 to 10% (preferably 0.1 to 3%) by volume based on the total volume of gas introduced into the oxidation zone (the term gas being used throughout to include a vapor and the total volume of gas introduced into the oxidation zone being calculated by adding together the volumes of each gas at the temperature of introduction of that gas). The water vapor is preferably introduced into the oxidation zone in admixture with the oxidizing gas. When the oxidizing gas is atmospheric air, it may be found that the air contains sufficient moisture so that no moisture need be added. If the air is scrubbed to remove gaseous impurities, this may be done in such manner as to leave the quantity of water vapor contained in the air unchanged or so as to increase the quantity of water vapor in the air. The water vapor may be introduced in suspension in the carrier gas.

Various conditioners and other agents may be introduced into the reaction chamber. Thus, for example, when the chloride is titanium tetrachloride and the product oxide is titanium dioxide, aluminium oxide may be formed within the reaction chamber and incorporated with the product titanium dioxide to aid the formation of rutile, to reduce any tendency for the formation of a sintered deposit of titanium dioxide on the walls of the reaction chamber (any deposit that does form being in the form of a softer type of scale—especially when the aluminium oxide is formed by the introduction of aluminium chloride into the reaction chamber separately from the titanium tetrachloride), to improve other pigmentary properties (for example, anti-yellowing in stoving finishes) and to render the pigment neutral in reaction after suitable removal of chloride (for example, by degassing at a temperature of 600° C.). The tendency for the formation of a sintered deposit of titanium dioxide mentioned above is particularly serious at a high rate of throughput of the reactants, for a given size of the reaction chamber, and at a rate of introduction of titanium tetrachloride which is less than, equal to, or slightly above, the rate necessary for stoichiometric reaction with the oxidizing gas. The quantity of aluminium oxide used is within the range of from 0.5% to 10.0%, advantageously from 0.5% to 4.0% and preferably from 1.0% to 2.5%, by weight based on the weight of the titanium dioxide product.

The aluminium oxide is advantageously formed by introducing aluminium chloride into the reaction chamber. The aluminium chloride vapor may be introduced into the reaction chamber in admixture with the titanium tetrachloride vapor, or it may be introduced into the chamber through third inlet means formed in the wall of the portion of the reaction chamber downstream from the second inlet means. When the titanium tetrachloride vapor is preheated by passing it through a heated tube, it advantageously is incorporated with the titanium tetrachloride vapor by introducing the aluminium chloride vapor into the heated tube. Instead, the aluminium oxide may be formed by incorporating powdered aluminium metal with the inert particulate refractory material or by introducing powdered aluminium metal in suspension in the titanium tetrachloride vapor.

Advantageously, the aluminium chloride is formed by passing chlorine into molten aluminium metal, the rate of production of aluminium chloride being controlled by varying the rate of supply of chlorine. Instead, the aluminium chloride may be formed by spraying molten aluminium metal into an atmosphere of chlorine.

Also, when the chloride is titanium tetrachloride and the product is titanium dioxide, silicon tetrachloride may be introduced into the reaction chamber in a quantity (calculated as $SiO_2$) within the range of from 0.05% to 1.0%, preferably from 0.1% to 0.5% by weight based on the weight of the product titanium dioxide. The introduction of silicon tetrachloride results in a tendency for the product titanium dioxide to have a smaller particle size. The silicon tetrachloride may be introduced into the reaction chamber through third inlet means formed in the wall of the portion of the reaction chamber downstream from the second inlet means, but is preferably introduced into the reaction chamber in admixture with chlorine introduced as barrier gas or in admixture with the titanium tetrachloride vapor. Titanium oxychloride, finely divided oxide, organic compounds (for example, hydrocarbons), and titanium esters, which act as or provide material for nucleation, may also be introduced into the reaction chamber.

Two forms of apparatus constructed in accordance with the invention and suitable for the production of pigmentary titanium dioxide by the oxidation of titanium tetrachloride will now be described by way of example in greater detail with reference to the accompanying drawings in which:

FIGURES 1 and 2 are diagrammatic axial sections of two forms of generally tubular reaction chambers.

The reaction chamber shown in FIG. 1 of the drawings and indicated generally by the reference numeral 1 is constructed of a non-metallic refractory material, for example, quartz.

That chamber comprises, naming the portions in order in the upstream direction with respect to the flow of the gaseous mixture within the chamber, a cylindrical portion 2, a tapered portion 3, a cylindrical inner wall 4 surrounded for a part of its length by a cylindrical outer wall 5, and a nozzle 6 which is coaxially situated within the inner wall 4. The cylindrical portion 2, the tapered portion 3, and the outer wall 5 are made in one piece. Any joints in the apparatus are effected by welding the adjacent parts together.

The tapered portion 3 tapers in the upstream direction, the diameter of the downstream end being equal to the diameter of the cylindrical portion 2, and the diameter of the upstream end being equal to the diameter of the inner wall 4. The inner wall 4 terminates short of both the tapered portion 3 and the outer wall 5 to form a circumferential slot 7 between the upstream end of the tapered portion 3 and the downstream end of the inner wall 4. The tapered portion 3 and the end of outer wall 5 are joined by an annular flange 8. A supply pipe 9 enables one of the reactants to be supplied to the region between the two walls 4 and 5, and the circumferential slot 7 serves as an inlet for the reactant supplied through the pipe 9. A supply pipe 10 enables the other reactant to be supplied to the interior of the inner wall 4, and the nozzle 6 enables a particulate refractory material to be introduced into the reaction chamber.

The inner surface of the tapered portion 3 is frusto-conical and can have a semi-angle of approximately 7° or less. Because the spray of inert particulate refractory material is conical with a semi-angle of approximately 7° the position of the end of the nozzle 6 must be chosen so that the spray covers the whole of the inner surface of the tapered portion 3. Thus, when the inner surface is frusto-conical with a semi-angle of approximately 7°, the apex of the imaginary cone of which the surface forms a part is situated at the end of the nozzle 6, and, when the inner surface is frusto-conical with a semi-angle of less than 7° the apex of the imaginary cone is situated at or upstream of the end of the nozzle 6.

A substantial length of the cylindrical portion 2 and the whole of the tapered portion 3 are provided with a cooling jacket 11 constructed of a metal, for example, aluminium. The inner surface of the cooling jacket 11 is cylindrical and has a diameter greater than that of the outer surface of the cylindrical portion 2. An inlet pipe 12 enables a gas to be introduced into the space 13 formed between the inner surface of the cooling jacket 11 and the outer surface of the cylindrical portion 2. The gas is prevented from escaping from the upstream end of the space 13 by providing the cooling jacket 11 with an inwardly extending flange portion 14 and inserting a thermally insulating gasket 15 between the flange portion 14 and the outer wall 5.

The portion of the reaction chamber upstream of the circumferential slot 7 is situated within a preheat furnace of which a part of the wall 16 is shown schematically.

The reaction chamber shown in FIG. 2 of the drawings is similar to that shown in FIG. 1, except that an inlet for a barrier gas is provided in order to shield the downstream end portion of the inner wall 4 from the reactant that is fed through the supply pipe 9.

The inlet for the barrier gas is formed by providing an intermediate generally cylindrical portion, which is indicated generally by the reference numeral 17, between the inner wall 4 and the other wall 5. The intermediate portion 17 is formed at its downstream end with a short length 18 of reduced diameter, from which a frusto-conical part 19 leads to the main part 20. A supply pipe 21 enables the barrier gas to be fed to the space between the inner wall 4 and the intermediate portion 17. At their downstream ends, the intermediate portion 17 and the inner wall 4 terminate in the same plane.

In the operation of a process for the vapor-phase oxidation of a chloride carried out in a reaction chamber as described with reference to FIG. 1, one of the reactants is fed through the supply pipe 9 and the other reactant is fed through the supply pipe 10. An inert particulate refractory material in suspension in a gas, for example, oxygen, air or chlorine, is fed through the nozzle 6, the arrangement being such that the inert particulate material impinges on the downstream end portion of the inner wall 4 adjacent to the slot 7 and on the inner surface of the tapered portion 3 and of the cylindrical portion 2. If the gas is an oxidizing gas, the preheated chloride must be fed through the supply pipe 9 and the preheated oxidizing gas must be fed through the supply pipe 10. A suitable liquid coolant for example, water, is passed through the cooling jacket 11, and a suitable coolant gas, for example, air, is introduced into the space 13 between the cooling jacket 11 and the reaction chamber.

The reaction chamber shown in FIG. 2 is operated in the same manner as that described with reference to the reaction chamber shown in FIG. 1, except that a barrier gas, preferably nitrogen or substantially pure chlorine, is supplied to the pipe 21 at a sufficiently high pressure to ensure that the barrier gas leaves the space between the inner wall 4 and the intermediate portion 17 as a highly turbulent stream. The barrier gas then prevents any of the reactant that is supplied through the pipe 9, which is preferably the chloride, from coming into contact with the downstream end portion of the inner wall 4. Thus, the use of a barrier gas still further reduces the risk that some of the product oxide will form as a deposit on the inner wall 4.

If desired, the reaction chamber shown in FIG. 2 may be modified in that the part 18 of the intermediate portion 17 may be dispensed with, the frusto-conical part 19 then being the end part of the intermediate portion 17. The intermediate portion 17 and the inner wall 4 must, however, still terminate in the same plane. Further, the part 19 and (when it is present) the part 18, and the corresponding portion of the inner wall 4, may be made of a thinner material than the main part 20 and the remainder of the inner wall 4, respectively.

The following examples illustrate the invention.

EXAMPLE I

Titanium dioxide was produced by the vapor-phase oxidation of titanium tetrachloride using a reaction chamber of the form shown in FIG. 1 of the drawings.

The reaction chamber was constructed of quartz. The downstream end of the reaction chamber was connected to a water cooled settling chamber in order that the product oxide could be separated from the inert particulate refractory material.

Titanium tetrachloride vapor, produced in a flash boiler or other suitable apparatus, was preheated to a temperature of 990° C. and introduced into the reaction chamber through the supply pipe 9 and the circumferential slot 7 at a rate of 250 pounds per hour.

Oxygen was first saturated with water vapor at a temperature of 30° C. and then preheated to a temperature of 1010° C. before being introduced into the reaction chamber through the supply pipe 10 at a rate of 945 cubic feet per hour (measured at N.T.P.).

Oxygen, which had been heated to a temperature of 500° C., was supplied to the nozzle 6 at a pressure of 60 pounds per square inch, the rate of supply of oxygen through the nozzle 6 being 170 cubic feet per hour (measured at N.T.P.). Silica sand having mesh sizes within the range of from −10 to +20 mesh (B.S.S) was introduced into the oxygen supplied to the nozzle 6 at a rate of 120 pounds per hour.

Water was passed through the cooling jacket 11, and air was introduced into the space 13 between the cooling jacket and the reaction chamber. The remainder of the portion of the reaction chamber downstream of the second inlet means was cooled by natural air convection currents. In this way the temperature of the inner surface of the cylindrical portion 2 and the tapered portion 3 was maintained at a temperature which was estimated to be of the order of 750–850° C.

The total quantity of oxygen introduced into the reaction chamber was considerably in excess of that required to react stoichiometrically with the titanium tetrachloride. The process was operated for a period of 30 minutes, and, throughout this period, no substantial build-up of product titanium dioxide on the walls of the reaction chamber occurred.

The silica sand was removed from the gas stream leaving the reaction chamber by means of the water cooled settling chamber, and the product titanium dioxide was thereafter removed from the gas stream by means of a conventional system of cyclones and filters and degassed at a temperature of 600° C. for a period of 2 hours.

The titanium dioxide produced was found to have a mean particle size of 0.23 micron and a tinting strength (measured on the Reynolds scale) of 1650, 93% of the product being in the rutile form.

EXAMPLE II

Titanium dioxide was produced by the vapor-phase oxidation of titanium tetrachloride in the reaction chamber used for the process described in Example I.

Titanium tetrachloride vapor produced in a flash boiler was preheated to a temperature of 995° C. and introduced into the reaction chamber through the supply pipe 9 at a rate of 450 pounds per hour.

Oxygen, which had been saturated with water vapor at a temperature of 30° C., was preheated to a temperature of 1020° C. and introduced into the reaction chamber through supply pipe 10 at a rate of 945 cubic feet per hour (measured at N.T.P).

Aluminium chloride vapor was produced by passing chlorine in molten aluminium metal contained in a steel vessel lined with a refractory material. The aluminium chloride vapor was then introduced into the reaction chamber in admixture with the titanium tetrachloride at a rate of 9 pounds per hour.

Oxygen, which had been heated to a temperature of 500° C., was supplied to the nozzle 6 at a pressure of 60 pounds per square inch, the rate of supply of oxygen through the nozzle being 170 cubic feet per hour (measured at N.T.P.). Silica sand having mesh sizes within the range of from −10 to +20 mesh (B.S.S) was introduced into the oxygen supplied to the nozzle 6 at a rate of 120 pounds per hour.

The cooling arrangements were the same as those employed in the process described in Example I. The process was operated for a period of 1 hour and, throughout this period, no substantial build-up of product titanium dioxide on the walls of the reaction chamber occurred.

After the removal of the silica sand and the product titanium dioxide from the gas stream and the degassing of the titanium dioxide as described in Example I, the titanium dioxide obtained was found to have a mean particle size of 0.30 micron and a tinting strength (measured on the Reynolds scale) of 1600, and 99% of the titanium dioxide was in the rutile form.

The effect of the aluminium chloride was to reduce the tendency for the formation of a sintered deposit of titanium dioxide on the walls of the reaction chamber, which tendency would otherwise be appreciable at the high rate of introduction of the titanium tetrachloride used in this example. The pigment produced by this process also had a higher rutile content and a lower photosensitivity than the pigment produced in accordance with the process described in Example I.

EXAMPLE III

Titanium dioxide was produced by the vapor-phase oxidation of titanium tetrachloride in the reaction chamber used for the process described in Example I.

Titanium tetrachloride vapor produced in a flash boiler was preheated to a temperature of 990° C., and introduced into the reaction chamber through the supply pipe 9 and the circumferential slot 7 at a rate of 450 pounds per hour.

Oxygen, flowing at the rate of 850 cubic feet per hour (measured at N.T.P.), was mixed with air flowing at the rate of 400 cubic feet per hour (measured at N.T.P.), and the mixture was saturated with water vapor at a temperature of 32° C. and then preheated to 1020° C. The mixture was then introduced into the reaction chamber through the supply pipe 10.

Aluminium chloride vapor was produced as described in Example II and introduced into the reaction chamber in admixture with the titanium tetrachloride at a rate of 9 pounds per hour.

The introduction of silica sand into the reaction chamber through the nozzle 6 in suspension in oxygen was carried out as described in Example II.

The cooling of the reaction chamber and the arrangements for the removal of the silica sand and the product titanium dioxide from the gas stream and for degassing the titanium dioxide were as described in Example I. The process was operated for a period of 2½ hours, and, throughout this period, no substantial build-up of titanium dioxide on the walls of the reaction chamber occurred.

The effect of using air as a diluent gas in the supply of oxidizing gas resulted in the production of titanium dioxide having a smaller particle size than that obtained in Example II. The reaction was also less fierce than the reaction carried out under the similar conditions described in Example II.

The titanium dioxide obtained after degassing was found to have a tinting strength (measured on the Reynolds scale) of 1650, and a mean particle size of 0.23 micron, 99% of the titanium dioxide being in the rutile form.

EXAMPLE IV

Titanium dioxide was produced by the vapor-phase oxidation of titanium tetrachloride in the reaction chamber used for the process described in Example I.

Titanium tetrachloride vapor produced in a flash boiler was preheated to a temperature of 995° C., and introduced into the reaction chamber through the supply pipe 9 and the circumferential slot 7 at a rate of 450 pounds per hour.

Oxygen, which had been saturated with water vapor at a temperature of 30° C., was preheated to a temperature of 1020° C. and introduced into the reaction chamber through supply pipe 10 at a rate of 945 cubic feet per hour (measured at N.T.P.).

Aluminium chloride vapor, produced as described in Example II, was introduced into the reaction chamber in admixture with the titanium tetrachloride at a rate of 9 pounds per hour. Silicon tetrachloride was also introduced into the reaction chamber in admixture with the titanium tetrachloride at a rate of 7.5 pounds per hour.

The introduction of silica sand into the reaction chamber through the nozzle 6 in suspension in oxygen was carried out as described in Example II.

The cooling of the reaction chamber and the arrangements for the removal of the silica sand and the product titanium dioxide from the gas stream and for the degassing of the titanium dioxide were as described in Example I. The process was operated for a period of 3½ hours, and, throughout this period, no substantial build-up of titanium dioxide on the walls of the reaction chamber occurred.

The introduction of silicon tetrachloride into the reaction chamber resulted in the production of titanium dioxide having a smaller particle size than that obtained in Example II. Also, the very small amount of titanium dioxide that was deposited on the walls of the reaction chamber was of a very soft and easily removable nature.

The titanium dioxide obtained after degassing was found to have a tinting strength (measured on the Reynolds scale) of 1650 and a mean particle size of 0.23 micron, 97% of the titanium dioxide being in the rutile form.

EXAMPLE V

Titanium dioxide was produced by the vapor-phase oxidation of titanium tetrachloride using a reaction chamber of the form shown in FIG. 2 of the drawings.

The reaction chamber was contructed of quartz. The portion of the reaction chamber downstream of the second inlet means was cooled by means of a stream of air pumped into the space 13 between the reaction chamber and the cooling jacket 11 through the inlet pipe 12. The jacket 11 was constructed of aluminium and through it flowed a stream of water. The portion of the reaction chamber downstream of the second inlet means was, of course, only partially surrounded by the cooling jacket, the remainder being cooled by natural air convection currents. In this way the temperature of the inner surface of the portion of the reaction chamber downstream of the second inlet means was maintained at a temperature below 900° C.

Liquid titanium tetrachloride was fed to a flash boiler at a rate of 1000 pounds per hour, and the resulting vapor was preheated to a temperature of 900° C. and introduced into the reaction chamber through the supply pipe 9 and the circumferential slot 7. The velocity of the titanium tetrachloride vapor leaving the slot was approximately 138 feet per second. Oxygen was first saturated with water vapor at a temperature of 36° C., and then preheated to a temperature of 1050° C. before being introduced into the reaction chamber through the supply pipe 10 at a rate of 1800 cubic feet per hour (measured at N.T.P.). The amount of water vapor in the oxygen was 1.96 percent by volume based on the total volume of all gases and vapors entering the chamber calculated at the temperature of entry of each gas or vapor.

Oxygen, which had been heated to a temperature of 500° C., was supplied to the nozzle 6 at a pressure of 60 pounds per square inch and at a rate of 270 cubic feet per hour (measured at N.T.P.). Silica sand having mesh sizes within the range of from −10 to +20 mesh (B.S.S.) was introduced into the oxygen supplied to the nozzle 6 at a rate of 210 pounds per hour. The velocity of the suspension of sand in oxygen when leaving the nozzle 6 was approximately 348 feet per second.

The total quantity of oxygen introduced into the chamber was approximately 10 percent in excess of that required to react stoichiometrically with the titanium tetrachloride.

Dry nitrogen was preheated to a temperature of 1000° C. and introduced into the space between the inner wall 4 and the intermediate portion 17 through the supply pipe 21 at a rate of 475 cubic feet per hour (measured at N.T.P.). The nitrogen emerged from the said space at an estimated velocity of 275 feet per second in the form of a highly turbulent stream of gas, which acted as a barrier gas to shield the inner surface of the reaction chamber immediately adjacent to and upstream of the second inlet means from the reactants in order to reduce any tendency for product oxide to be deposited thereon.

The reaction chamber was connected to a series of water-cooled aluminium tubes, and the gas stream leaving the reaction chamber was rapidly cooled to a temperature of approximately 200° C. during its passage through these tubes. The silica sand was then removed from the reaction products by means of a water-cooled settling chamber, and the titanium dioxide particles were removed from the gas stream by means of a conventional system of cyclones and filters. The titanium dioxide was then heated to a temperature of 600° C. and maintained at that temperature for a period of 2 hours in order to remove adsorbed chlorine and hydrogen chloride, and to decompose any titanium oxychlorides present.

The titanium dioxide produced was found to have a mean particle size of 0.24 micron and a tinting strength (measured on the Reynolds scale) of 1650, 95% of the product being in the rutile form.

The process described above was carried out for a continuous period of 2 hours, and, throughout this period, no substantial build-up of titanium dioxide on the walls of the reaction chamber occurred.

What is claimed is:

1. Apparatus for the manufacture of an oxide of one of the elements titanium, zirconium, iron, aluminum and silicon by reacting, as one reactant, a chloride of the element with, as another reactant, an oxidizing gas in the vapor phase which comprises a reaction chamber having a generally tubular refractory part provided with an intermediate portion which is tapered inwardly in an upstream direction with respect to the reactant flow and an upstream portion comprising a tubular refractory outer wall having a diameter greater than the diameter of the tapered portion at its upstream end, said outer wall surrounding, for a part of its length, a tubular refractory inner wall, one end of the inner wall providing a first inlet means and terminating in cooperative association with said tapered portion to define a circumferentially extending second inlet means, means for feeding one reactant into the region between the outer and inner tubular walls for introduction through said circumferentially extending second inlet means, means for feeding the other reactant through the inner wall for introduction through said first inlet means, said second inlet means being situated downstream of said first inlet means, a nozzle arranged coaxially within the chamber upstream of the second inlet means which is adapted to direct a conical spray of particulate material suspended in a carrier gas upon at least the tapered portion of the generally tubular refractory part adjacent to said second inlet means, the degree of taper of said refractory part immediately adjacent to and downstream of the second inlet means being sufficiently small to enable the whole of the tapered surface to be seen from the end of the nozzle, and cooling means disposed coaxially about said reaction chamber downstream of said second inlet means.

2. Apparatus as set forth in claim 1 in which the generally tubular refractory part including its tapered portion and the tubular refractory outer wall are made in one piece.

3. Apparatus as set forth in claim 1 in which the reaction chamber is circular in cross-section and the internal diameter thereof is substantially the same throughout its length both upstream and downstream from the tapered portion.

4. Apparatus as set forth in claim 1 in which the cooling means comprises a jacket mounted coaxially about and out of contact with said reaction chamber to provide a space between said chamber and said jacket which is adapted to receive a coolant gas, said jacket being adapted to receive a coolant liquid.

5. Apparatus as set forth in claim 1 in which the reaction chamber is cylindrical and said cooling means includes a coaxially mounted cylindrical metal jacket having an inner wall greater in diameter than that of the outer surface of the reaction chamber, the space between the reaction chamber and the jacket being adapted to receive a cooling gas and the jacket being adapted to contain a cooling liquid.

6. Apparatus for the manufacture of an oxide of one of the elements titanium, zirconium, iron, aluminum and silicon by reacting, as one reactant, a chloride of the element with, as another reactant, an oxidizing gas in the vapor phase which comprises a generally tubular refractory reaction chamber having a tubular refractory part provided with an intermediate portion which is tapered inwardly in an upstream direction with respect to the reactant flow and an upstream portion comprising a tubular refractory outer wall having a diameter greater than the diameter of the tapered portion at its upstream end, said outer wall surrounding, for a part of its length, a tubular refractory inner wall and a tubular refractory intermediate wall, the inner and intermediate walls terminating in the same plane and short of the inwardly tapered portion of the tubular refractory part, the terminus of the inner wall providing a first inlet means, the terminus of the intermediate wall being spaced from said tapered portion of the tubular refractory part to define a circumferentially extending second inlet means, means for feeding one reactant into the region between the outer and intermediate tubular walls for introduction through said circumferentially extending second inlet means, means for feeding a barrier gas into the region between the intermediate and inner walls, means for feeding the other reactant through the inner wall for introduction through said first inlet means, said second inlet means being situated downstream of said first inlet means, a nozzle arranged coaxially within the chamber upstream of the second inlet means which is adapted to direct a conical spray of particulate material suspended in a carrier gas upon at least the tapered portion of the generally tubular refractory part adjacent to said second inlet means, the degree of taper of said refractory part immediately adjacent to and downstream of the second inlet means being sufficiently small to enable the whole of the tapered surface to be seen from the end of the nozzle, and cooling means disposed coaxially about said reaction chamber downstream of said second inlet means.

7. Apparatus as set forth in claim 6 in which the generally tubular refractory part including its tapered portion and the tubular refractory outer wall are made in one piece.

8. Apparatus as set forth in claim 6 in which the reaction chamber is circular in cross-section and the internal diameter thereof is substantially the same throughout its length both upstream and downstream from the tapered portion.

9. Apparatus as set forth in claim 6 in which the cooling means comprises a jacket mounted coaxially about and out of contact with said reaction chamber to provide a space between said chamber and said jacket which is adapted to receive a coolant gas, said jacket being adapted to receive a coolant liquid.

10. Apparatus as set forth in claim 6 in which the reaction chamber is cylindrical and said cooling means includes a coaxially mounted cylindrical metal jacket having an inner wall greater in diameter than that of the outer surface of the reaction chamber, the space between the reaction chamber and the jacket being adapted to receive a cooling gas and the jacket being adapted to contain a cooling liquid.

References Cited by the Examiner

UNITED STATES PATENTS

| 2,897,062 | 7/1959 | Minarik | 23—259.5 X |
| 3,048,476 | 8/1962 | Dwyer | 23—284 |
| 3,069,282 | 12/1962 | Allen | 23—202 |

MORRIS O. WOLK, *Primary Examiner.*

JAMES H. TAYMAN, JR., *Examiner.*